US011761385B2

United States Patent
McCarthy et al.

(10) Patent No.: US 11,761,385 B2
(45) Date of Patent: Sep. 19, 2023

(54) TURBINE ENGINE SHAFT SHEAR DETECTION

(71) Applicant: Pratt & Whitney Canada Corp., Longueuil (CA)

(72) Inventors: Sean McCarthy, Beaconshield (CA); Jasraj Chahal, Lasalle (CA); Philippe Beauchesne-Martel, Brossard (CA); Roja Tabar, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 57 days.

(21) Appl. No.: 17/372,761

(22) Filed: Jul. 12, 2021

(65) Prior Publication Data
US 2023/0010174 A1 Jan. 12, 2023

(51) Int. Cl.
F02C 9/28 (2006.01)
F01D 21/06 (2006.01)
F01D 21/00 (2006.01)
F01D 21/04 (2006.01)
F02C 7/36 (2006.01)

(52) U.S. Cl.
CPC .............. *F02C 9/28* (2013.01); *F01D 21/003* (2013.01); *F01D 21/04* (2013.01); *F01D 21/06* (2013.01); *F02C 7/36* (2013.01); *F05D 2220/323* (2013.01); *F05D 2260/80* (2013.01); *F05D 2270/09* (2013.01)

(58) Field of Classification Search
CPC ........ F01D 21/003; F01D 21/04; F01D 21/06; F05D 2260/80; F05D 2270/09; F05D 2270/114; F02C 9/28
See application file for complete search history.

(56) References Cited

U.S. PATENT DOCUMENTS

| 10,167,784 B2 * | 1/2019 | Dooley | F02C 9/46 |
| 10,228,305 B2 * | 3/2019 | Shenouda | G01M 15/14 |
| 10,316,689 B2 | 6/2019 | Fletcher | |
| 10,465,554 B2 | 11/2019 | MacDonald | |
| 10,641,126 B2 * | 5/2020 | Mason | F01D 5/06 |
| 2016/0178464 A1 | 6/2016 | Burns | |
| 2019/0292936 A1 * | 9/2019 | Birch | G01M 15/14 |
| 2021/0095602 A1 | 4/2021 | Calderon | |

OTHER PUBLICATIONS

EP search report for EP22184544.9 dated Nov. 25, 2022.

* cited by examiner

*Primary Examiner* — Juan G Flores
*Assistant Examiner* — Jason G Davis
(74) *Attorney, Agent, or Firm* — Getz Balich LLC (57) ABSTRACT

A method is provided involving a turbine engine. During this method, data is received indicative of twist of a shaft of the turbine engine. The data is monitored over time to identity one or more reversal events while the turbine engine is operating, where each of the reversal events corresponds to a reversal in a value sign of the data. Shaft shear is identified in the shaft based on occurrence of N number of the reversal events.

20 Claims, 9 Drawing Sheets

FIG. 10

TURBINE ENGINE SHAFT SHEAR DETECTION

BACKGROUND OF THE DISCLOSURE

1. Technical Field

This disclosure relates generally to a turbine engine and, more particularly, to shaft shear detection.

2. Background Information

A gas turbine engine includes an engine shaft that connects a turbine rotor to a load such as a fan, a propeller or a helicopter rotor. Various systems and method exist for preventing turbine rotor overspeed or shear of the engine shaft. While prior art systems and methods in this space have various benefits, there is still room in the art for improvement.

SUMMARY OF THE DISCLOSURE

According to an aspect of the present disclosure, a method is provided involving a turbine engine. During this method, data is received indicative of twist of a shaft of the turbine engine. The data is monitored over time to identity one or more reversal events while the turbine engine is operating, where each of the reversal events corresponds to a reversal in a value sign of the data. Shaft shear is identified in the shaft based on occurrence of N number of the reversal events.

According to another aspect of the present disclosure, another method is provided method involving a turbine engine. During this method, data is provided indicative of torque applied to a shaft of the turbine engine. The data is monitored over a period to identify ringing in the monitored data while the turbine engine is operating. Shaft shear is identified in the shaft based on occurrence of the ringing in the monitored data.

According to still another aspect of the present disclosure, an assembly is provided for a turbine engine. This assembly includes a shaft, a sensor and a controller. The sensor is configured to provide sensor data indicative of a parameter of the shaft. The parameter is or includes twist of the shaft and/or torque applied to the shaft. The controller is configured to monitor the sensor data over time to identify one or more reversal events while the turbine engine is operating. Each of the reversal events corresponds to a reversal in a value sign of the sensor data. The controller is also configured to identify shaft shear in the shaft based on occurrence of N number of the reversal events.

The ringing may include a plurality of reversal events in the monitored data. Each of the reversal events may correspond to a reversal in a value sign of the monitored data.

The assembly may also include a fuel system. The fuel system may include a flow regulator. The controller may also be configured to signal the flow regulator to stop fuel flow when the shaft shear in the shaft is identified.

The assembly may also include a load and a turbine rotor. The shaft may couple the load to the turbine rotor.

The N number of the reversal events may be one of the reversal events.

The N number of the reversal events may be two or more of the reversal events.

The N number of the reversal events may change based on an operational parameter of the turbine engine.

The operational parameter may be or otherwise include rotational speed of the shaft.

The operational parameter may be or otherwise include power output of the turbine engine.

The identifying of the shaft shear in the shaft may also be based on the N number of the reversal events occurring within a predetermined period.

The predetermined period may change based on an operational parameter of the turbine engine.

The operational parameter may be or otherwise include rotational speed of the shaft.

The operational parameter may be or otherwise include power output of the turbine engine.

The identifying of the shaft shear in the shaft may also be based on a magnitude of at least one of the N number of the reversal events.

The method may also include measuring the data using a sensor.

The method may also include shutting down the turbine engine when the shaft shear in the shaft is identified.

The occurrence of the N number of the reversal events may be indicative of ringing of the data.

The data may also be indicative of torque applied to the shaft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes systems and methods for identifying/detecting shaft shear in a gas turbine engine. For ease of description, the turbine engine is described below as a turbofan turbine engine. The present disclosure, however, is not limited to such an exemplary turbine engine. The turbine engine, for example, may alternatively be a turbojet turbine engine, a turboprop turbine engine, a turboshaft turbine engine, an auxiliary power unit, an industrial turbine engine for a power plant, or any other type of turbine engine in which identifying shaft shear would be useful.

Figure 1:
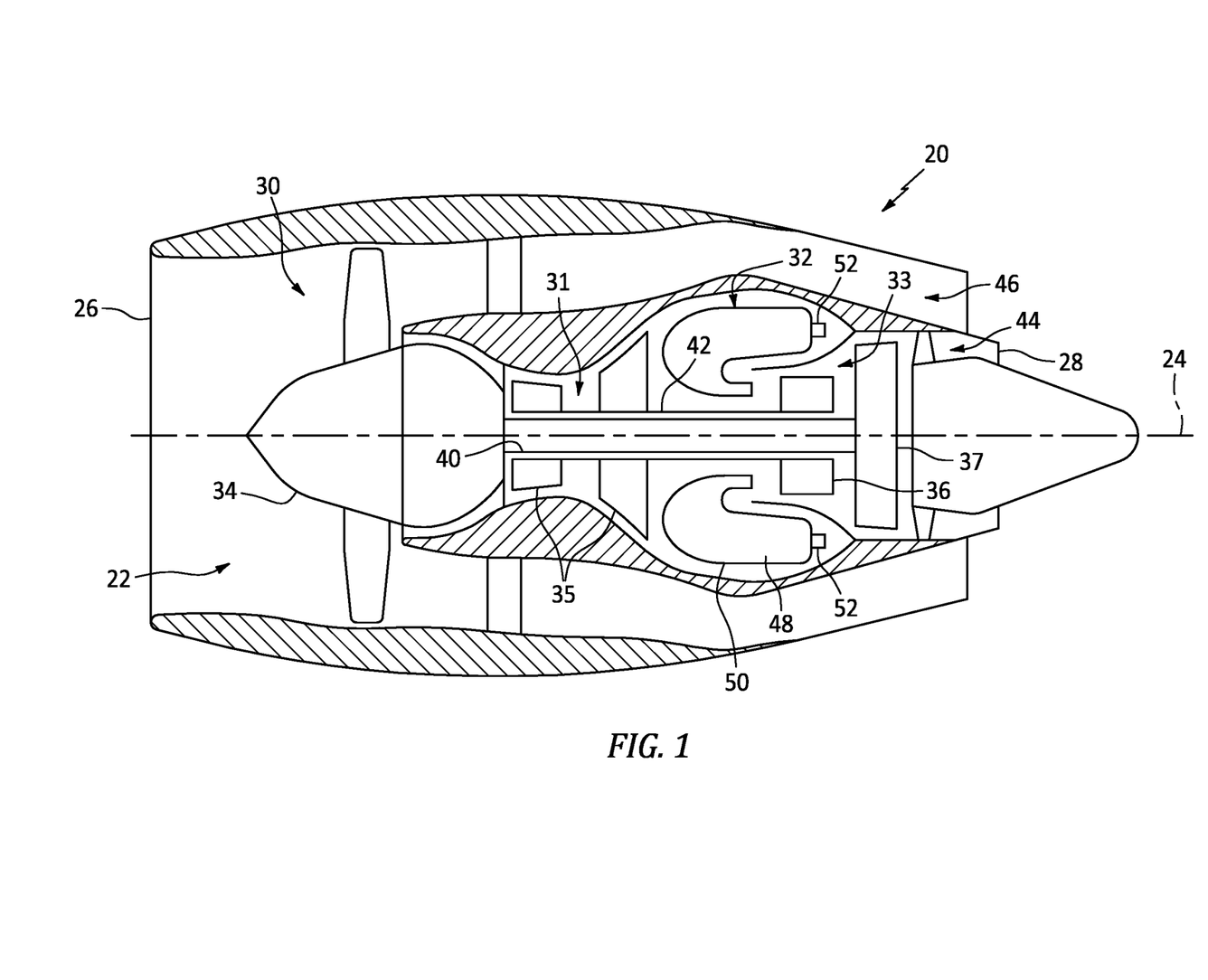
FIG. 1 is a side sectional illustration of an aircraft propulsion system with a turbine engine.

FIG. 1 illustrates an aircraft propulsion system 20 with a turbofan turbine engine 22. This turbine engine 22 extends along an axial centerline 24 of the turbine engine 22 between an upstream airflow inlet 26 and a downstream airflow exhaust 28. The turbine engine 22 includes a fan section 30, a compressor section 31, a combustor section 32 and a turbine section 33.

The fan section 30 includes a fan rotor 34. The compressor section 31 includes a compressor rotor 35. The turbine section 33 includes a high pressure turbine (HPT) rotor 36 and a low pressure turbine (LPT) rotor 37, where the LPT rotor 37 is configured as a power turbine rotor. Each of these rotors 34-37 includes a plurality of rotor blades arranged circumferentially around and connected to one or more respective rotor disks.

The fan rotor 34 is connected to the LPT rotor 37 through a low speed shaft 40. The compressor rotor 35 is connected to the HPT rotor 36 through a high speed shaft 42. The low speed shaft 40 and the high speed shaft 42 of FIG. 1 are rotatable about the axial centerline 24; e.g., a rotational axis. The low speed shaft 40 of FIG. 1 extends through a bore of the high speed shaft 42 between the fan rotor 34 and the LPT rotor 37.

During operation, air enters the turbine engine 22 through the airflow inlet 26. This air is directed through the fan section 30 and into a core flowpath 44 and a bypass flowpath 46. The core flowpath 44 extends sequentially through the engine sections 31-33; e.g., an engine core. The air within the core flowpath 44 may be referred to as "core air". The bypass flowpath 46 extends through a bypass duct, which bypasses the engine core. The air within the bypass flowpath 46 may be referred to as "bypass air".

The core air is compressed by the compressor rotor 35 and directed into a (e.g., annular) combustion chamber 48 of a (e.g., annular) combustor 50 in the combustor section 32. Fuel is injected into the combustion chamber 48 by one or more fuel injectors 52. This fuel is mixed with the compressed core air to provide a fuel-air mixture. The fuel-air mixture is ignited and combustion products thereof flow through and sequentially cause the HPT rotor 36 and the LPT rotor 37 to rotate. The rotation of the HPT rotor 36 drives rotation of the compressor rotor 35 and, thus, compression of air received from an inlet into the core flowpath 44. The rotation of the LPT rotor 37 drives rotation of the fan rotor 34, which propels bypass air through and out of the bypass flowpath 46. The propulsion of the bypass air may account for a significant portion (e.g., a majority) of thrust generated by the turbine engine 22.

Figure 2:
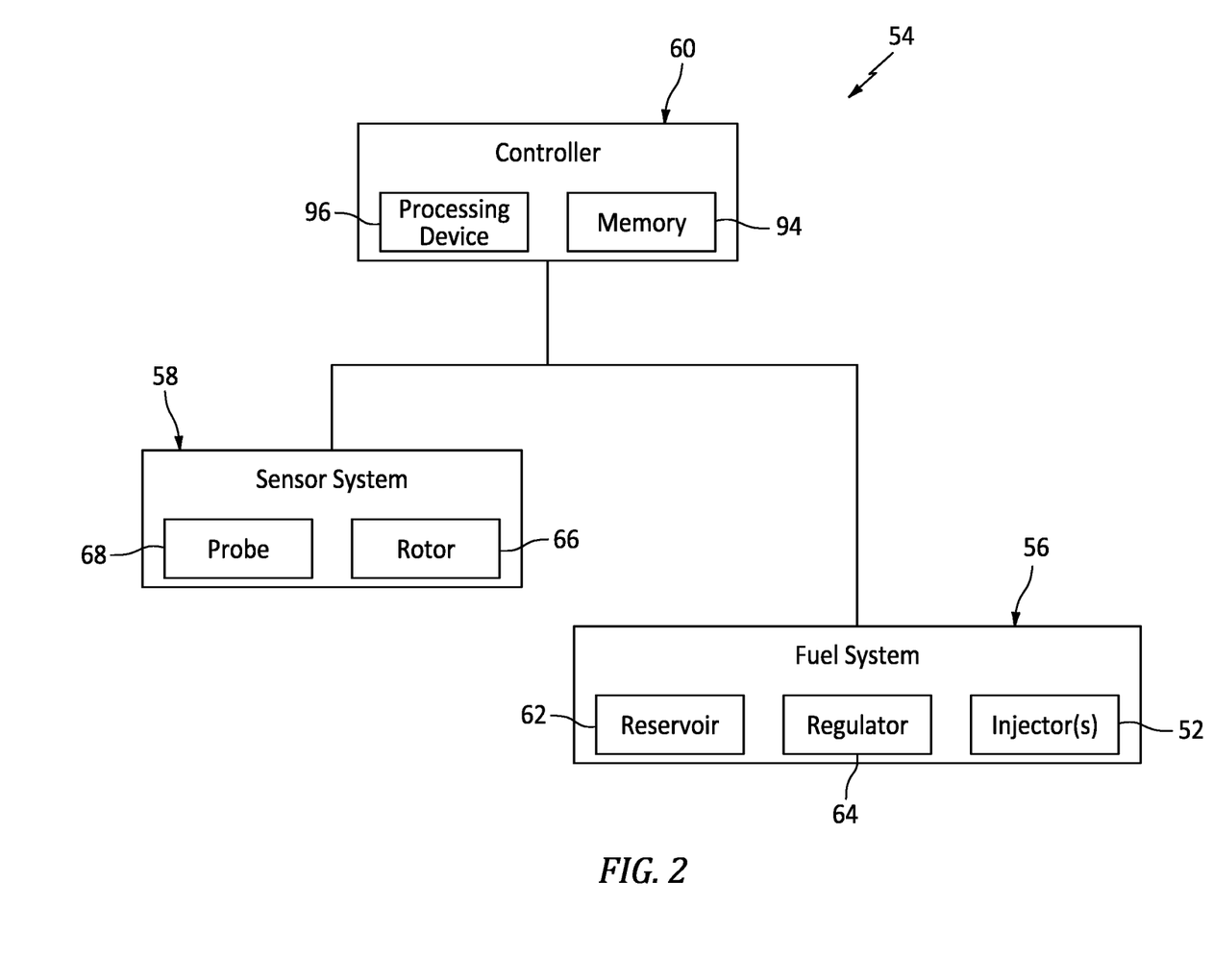
FIG. 2 is a schematic illustration of an assembly for the turbine engine.

FIG. 2 illustrates an assembly 54 for the turbine engine 22. This turbine engine assembly 54 includes a fuel system 56, a sensor system 58 and a controller 60.

The fuel system 56 of FIG. 2 includes a fuel reservoir 62, a fuel flow regulator 64 and the one or more fuel injectors 52. The fuel reservoir 62 may be configured as or otherwise include a container; e.g., a tank, a cylinder, a pressure vessel, a bladder, etc. The fuel reservoir 62 is configured to contain and hold a quantity of fuel. The flow regulator 64 may be configured as or otherwise include a pump (e.g., a main fuel pump) and/or a valve (e.g., a shutoff valve, a flow control valve, etc.). This flow regulator 64 is configured to regulate a flow of the fuel from the fuel reservoir 62 to the fuel injectors 52. The flow regulator 64 of FIG. 2, for example, is configured to direct (e.g., pump) the fuel out of the fuel reservoir 62 for delivery to the fuel injectors 52. The fuel system 56, of course, may also include one or more additional components such as, but not limited to, a fuel filter, a heat exchanger (e.g., a heater) and/or an additional flow regulator (e.g., a boost pump, a bypass valve, a pressure regulating valve, etc.).

The sensor system 58 is configured to measure one or more engine parameters indicative of shaft twist and/or shaft torque. The term "shaft twist" may describe a condition where at least an axial portion or an entirety of a shaft (e.g., temporarily and/or resiliently) twists along its axial centerline/rotational axis in response, for example, to a torque input. The term "shaft torque" may describe torque transmitted through at least an axial portion or an entirety of a shaft. The sensor system 58 of FIG. 3 includes a sensor rotor 66 and a sensor probe 68.

The sensor rotor 66 may be configured as a phonic wheel with inter-digited tooth pairs. The sensor rotor 66 of FIG. 3, for example, includes a torque rotor 70 and a reference rotor 72.

The torque rotor 70 is connected to (e.g., formed integral with, or fastened, welded, bonded and/or otherwise attached to) a shaft 74 of the turbine engine 22 at an axial first location 75, which engine shaft 74 may be configured as any one of the engine shafts 40, 42 in FIG. 1. The torque rotor 70 of FIG. 3 projects radially out from the engine shaft 74 to an outer periphery. Referring to FIG. 4, the torque rotor 70 includes one or more torque teeth 76 arranged circumferentially about the axial centerline 24 in a circular array at the torque rotor outer periphery.

Figure 3:
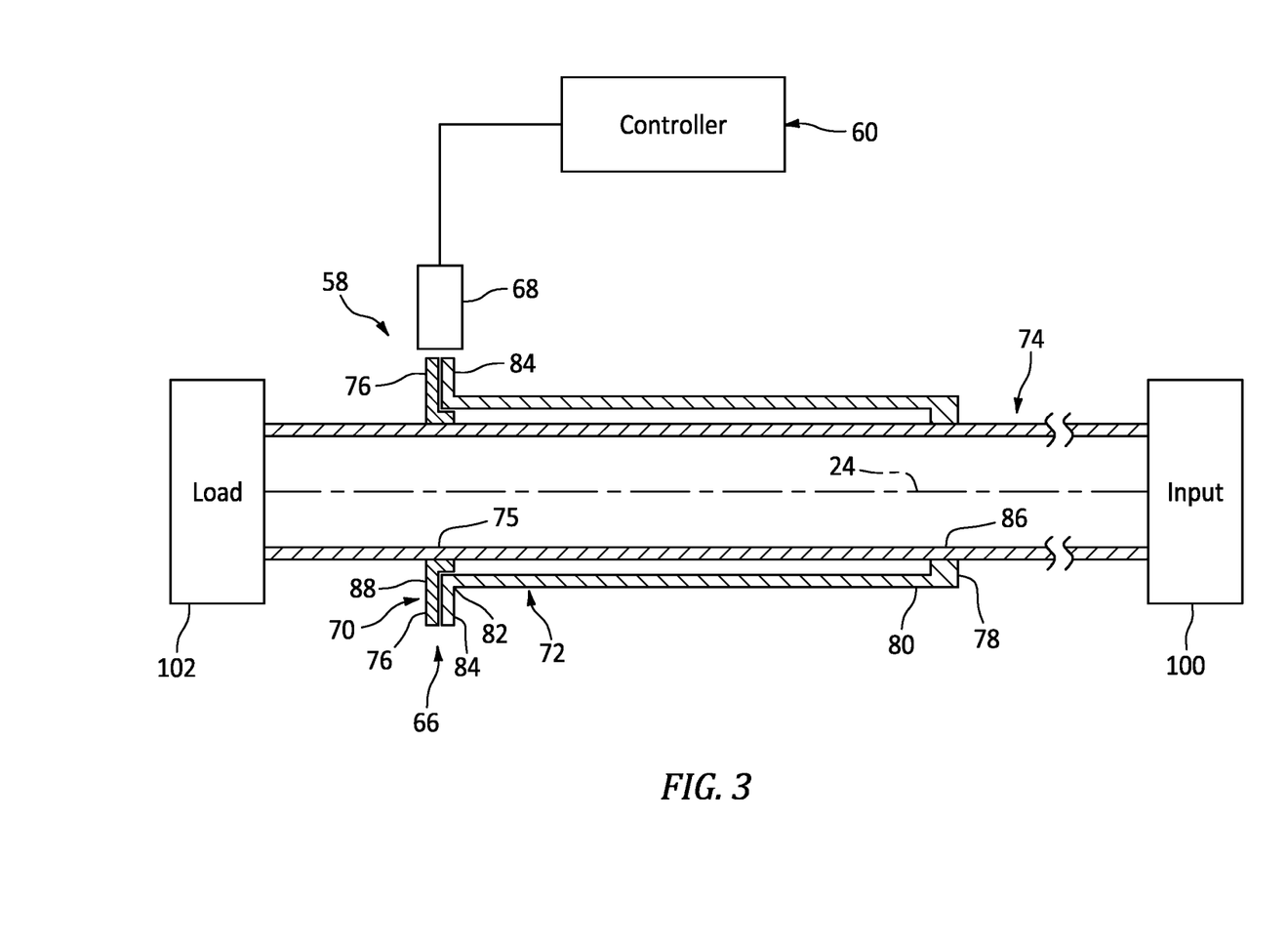
FIG. 3 is a schematic illustration of components of the turbine engine assembly configured with a rotor assembly of the turbine engine.
Figure 4:
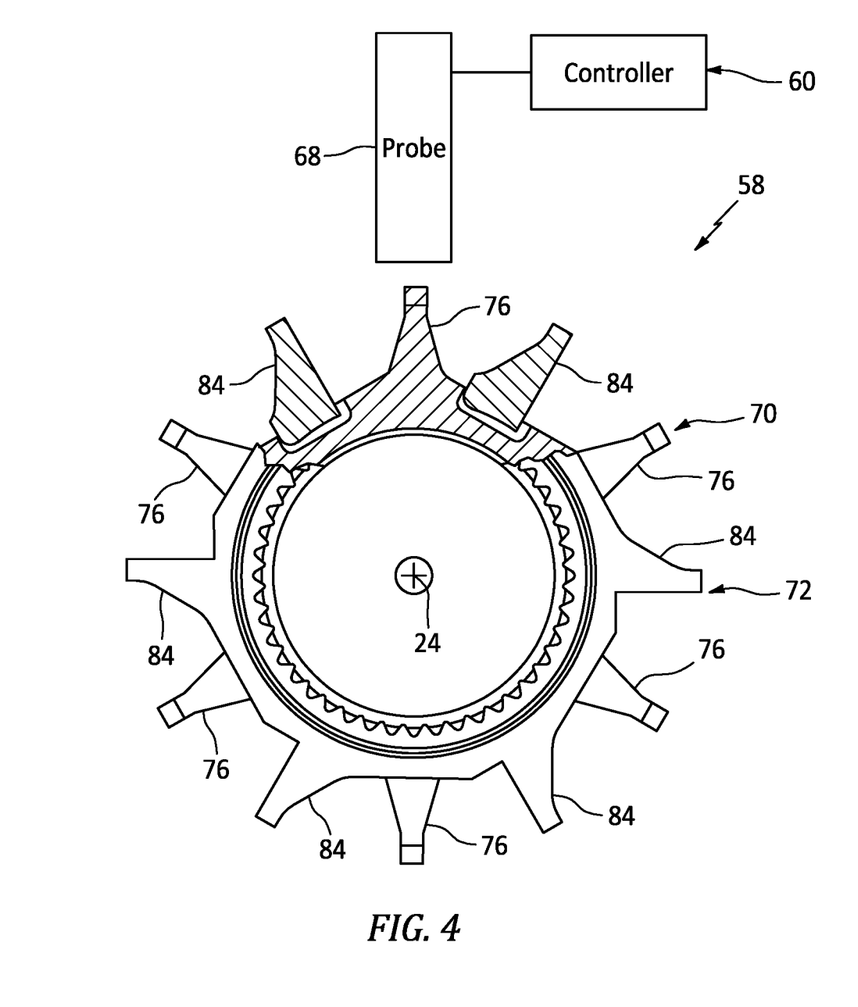
FIG. 4 is a cutaway illustration of a sensor rotor configured with other components of the turbine engine assembly.

Referring to FIG. 3, the reference rotor 72 includes a rotor mount 78, a rotor tube 80, a rotor hub 82 and one or more reference teeth 84 (e.g., see FIG. 4). The rotor mount 78 is connected to (e.g., formed integral with, or fastened, bonded and/or otherwise attached to) the engine shaft 74 at an axial second location 86. This second location 86 is axially displaced from the first location 75 along the axial centerline 24 by a relatively large distance. The rotor tube 80 connects the rotor hub 82 to the rotor mount 78. The rotor tube 80 of FIG. 3, for example, is formed integral with and extends axially along the axial centerline 24 and the engine shaft 74 from the rotor mount 78 to the rotor hub 82. An entirety of the rotor tube 80 is radially displaced outward from the engine shaft 74. The rotor hub 82 is arranged axially next to (e.g., immediately adjacent, but not touching) a hub 88 of the torque rotor 70. Referring to FIG. 4, the reference teeth 84 are arranged circumferentially about the axial centerline 24 in a circular array at an outer periphery of the rotor hub 82.

Figure 5A:
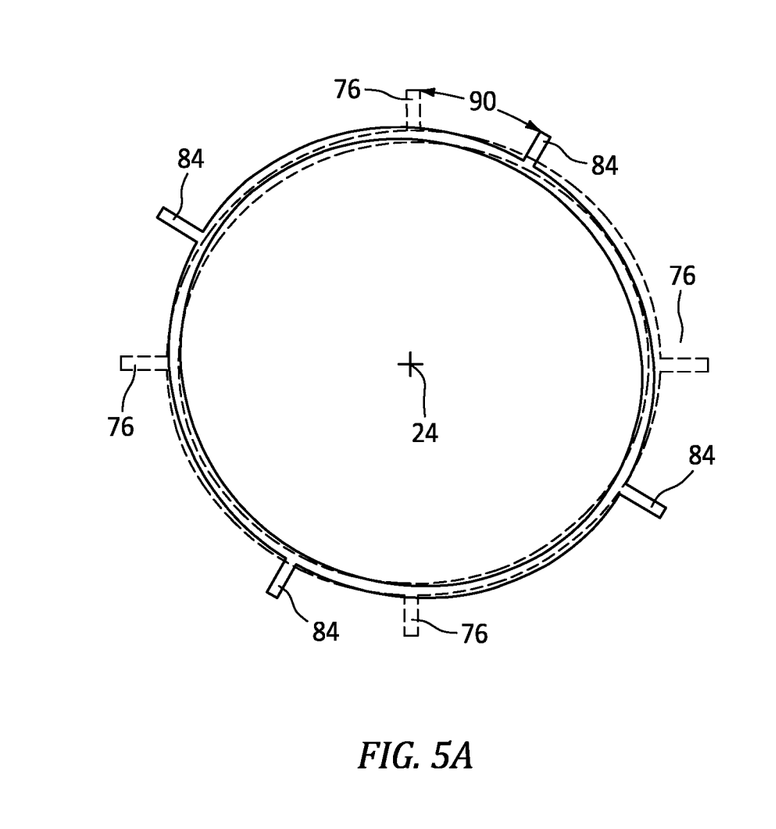
FIGS. 5A and 5B schematically illustrate movement between teeth of the sensor rotor during different modes of turbine engine operation.
Figure 5B:
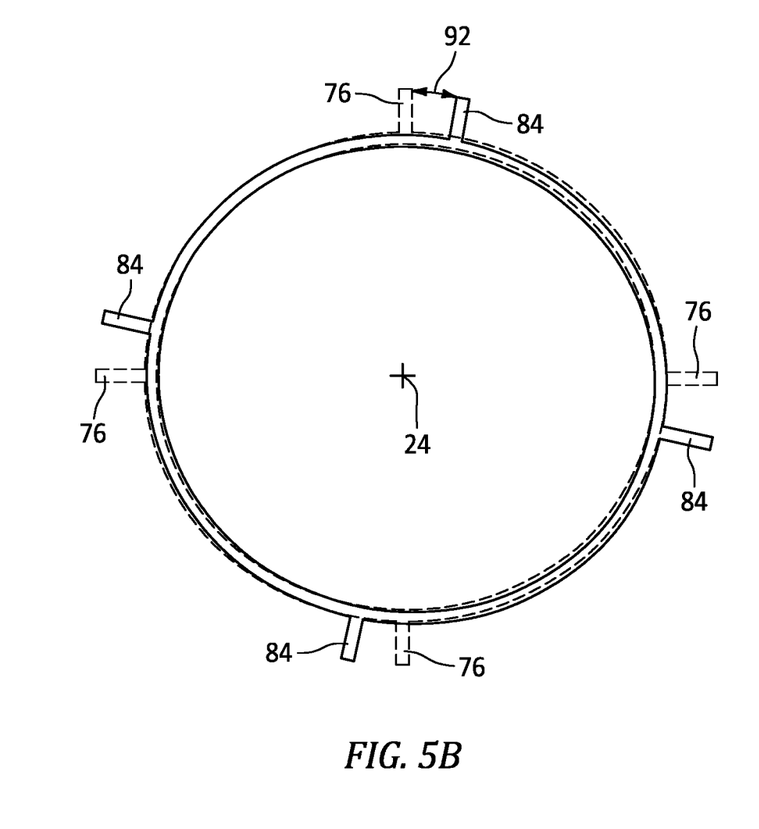

The torque teeth 76 of FIG. 4 are interspersed with the reference teeth 84, and vice versa. Each of the reference teeth 84, for example, is located within a respective gap circumferentially between a circumferentially adjacent pair of the torque teeth 76. Similarly, each of the torque teeth 76 is located within a respective gap circumferentially between a circumferentially adjacent pair of the reference teeth 84. With this arrangement, the torque teeth 76 are configured to circumferentially move (e.g., shift) relative to and without impediment (e.g., blockage, resistance, etc.) from the reference teeth 84 during operation of the turbine engine 22. For example, during a first condition (e.g., where the engine shaft 74 is unloaded or subject to a relatively small torque) of FIG. 5A, each of the reference teeth 84 is spaced from a respective torque tooth 76 by a circumferential first distance 90. During a second condition (e.g., where the engine shaft 74 is subject to a relatively high torque) of FIG. 5B, each of the reference teeth 84 is spaced from a respective torque tooth 76 by a circumferential second distance 92 that is different (e.g., greater or less) than the first distance 90.

Referring to FIG. 3, the sensor probe 68 may be configured as a magnetic pickup probe. The sensor probe 68 is configured to measure movement (e.g., shifts) between the torque teeth 76 and the reference teeth 84 during operation of the turbine engine 22. The sensor probe 68, for example, may be configured to output sensor data (e.g., a voltage signal) indicative of when each of the teeth 76, 84 passes a tip of the sensor probe 68. For example, the sensor probe 68 may generate/output an electric pulse each time a tip of one of the teeth 76, 84 passes the sensor probe tip. This sensor data may then be correlated to map or otherwise determine how the tips of adjacent pairs of the teeth 76 and 84 are moving relative to one another by the controller 60.

Referring to FIG. 2, the controller 60 is in signal communication with one or more of the turbine engine components 56 and 58. The controller 60 of FIG. 2, for example, may be hardwired to and/or wirelessly coupled with the turbine engine components 64 and 68.

The controller 60 may be configured as an onboard engine controller; e.g., an electronic engine controller (EEC), an electronic control unit (ECU), a full-authority digital engine controller (FADEC), etc. The controller 60 may be implemented with a combination of hardware and software. The hardware may include memory 94 and at least one processing device 96, which processing device 96 may include one or more single-core and/or multi-core processors. The hardware may also or alternatively include analog and/or digital circuitry other than that described above.

The memory 94 is configured to store software (e.g., program instructions) for execution by the processing device 96, which software execution may control and/or facilitate performance of one or more operations such as those described in the methods below. The memory 94 may be a non-transitory computer readable medium. For example, the memory 94 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 6:
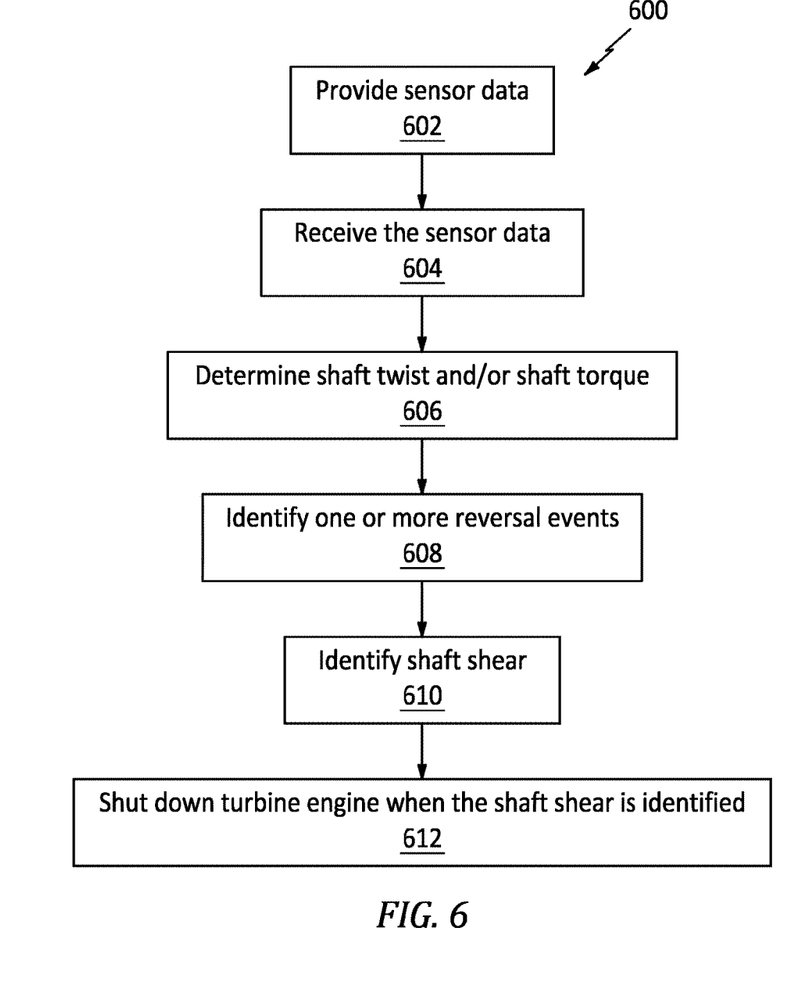
FIG. 6 is a flow diagram of a method involving the turbine engine.

FIG. 6 is a flow diagram of a method 600 involving (e.g., monitoring and/or controlling) a turbine engine. For ease of description, this method 600 is described below with reference to the turbine engine 22 of FIG. 1 and the turbine engine assembly 54 of FIG. 2. The method 600, however, may alternatively be performed for other turbine engine configurations and with other turbine engine assemblies.

In step 602, the sensor system 58 provides sensor data to the controller 60. In particular, the sensor system 58 of FIG. 3 measures the one or more engine parameters indicative of the twist in the engine shaft 74 (the shaft twist) and/or the torque applied to the engine shaft 74 (the shaft torque). The sensor probe 68 of FIGS. 3 and 4, for example, may generate and/or output an electric pulse each time the tip of one of the sensor rotor teeth 76, 84 passes (e.g., is in close radial proximity with) the tip of the sensor probe 68. These electrical pulses may be communicated from the sensor system 58 to the controller 60 as the sensor data. This sensor data is indicative of the shaft twist and/or the shaft torque as described below in further detail.

In step 604, the controller 60 receives the sensor data from the sensor system 58.

Figure 7:
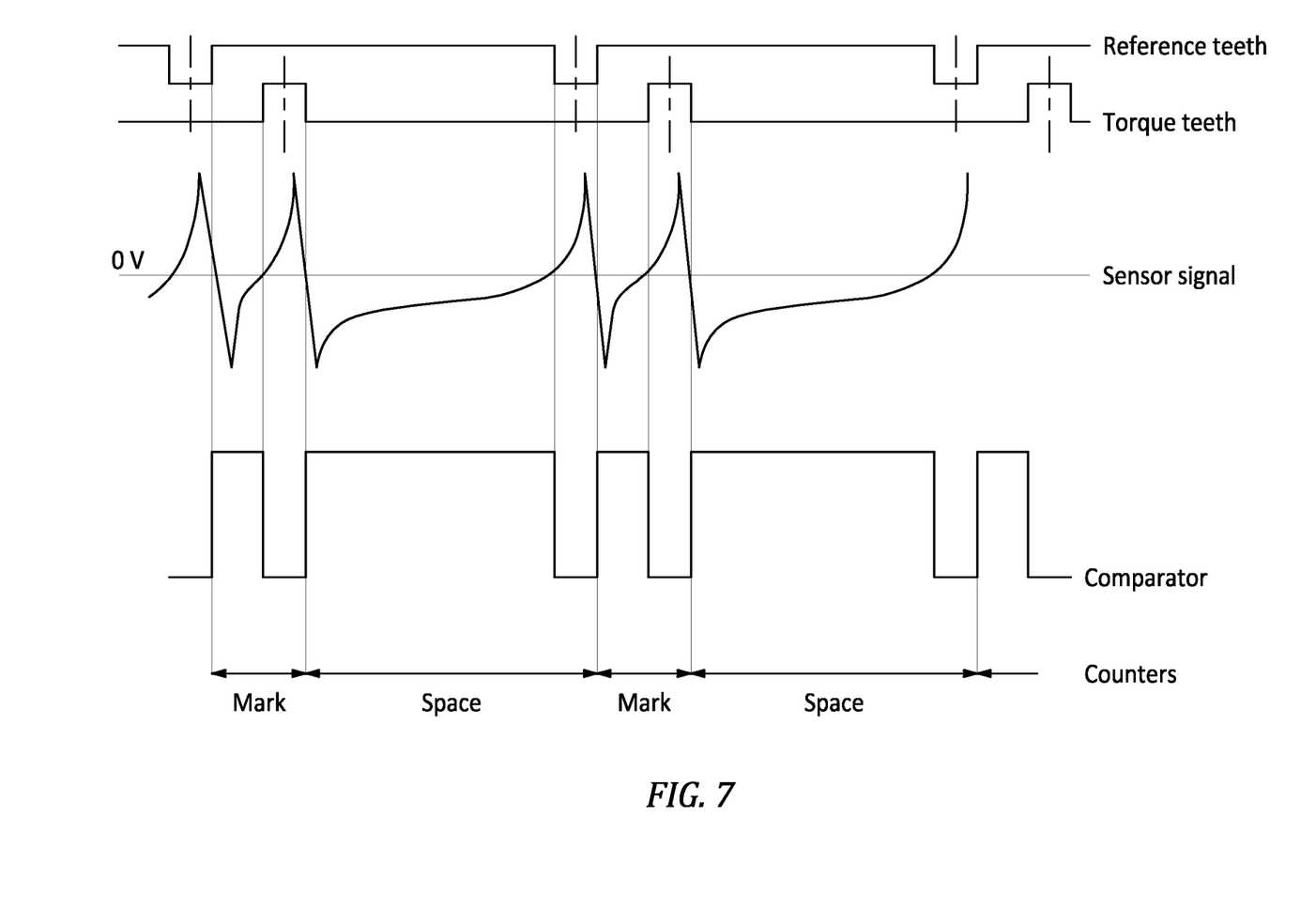
FIG. 7 graphically correlates sensor data (a sensor signal) with positions of the sensor rotor teeth and counter intervals.

In step 606, the controller 60 processes the received sensor data to determine shaft twist data and/or shaft torque data. The controller 60 of FIGS. 3 and 4, for example, processes the sensor data to identify when each of the sensor rotor teeth 76, 84 passes the sensor probe 68. FIG. 7 includes a graphic example of the sensor data communicated from the sensor system 58 to the controller 60 as a voltage wave—a sensor signal. This voltage wave includes a plurality of (e.g., high, top) peaks, where each of the peaks corresponds with the tip of one of the rotor sensor rotor teeth 76, 84 passing (e.g., directly radially below) the tip of the sensor probe 68. FIG. 7 illustrates how each set of the rotor teeth (e.g., one of the torque teeth 76 and an adjacent one of the reference teeth 84) passing the sensor probe 68 may generate a unique electrical signal wave. Using this correlation, the controller 60 may identify points where the signal wave crosses a baseline (e.g., a zero voltage line). Each time the signal wave crosses the baseline, the controller 60 may start or stop a respective counter. The time between the start and the stop of the respective counter may represent temporal duration (e.g., period of time) between a respective set of the sensor rotor teeth 76, 84 passing the sensor probe 68.

Figure 8A:
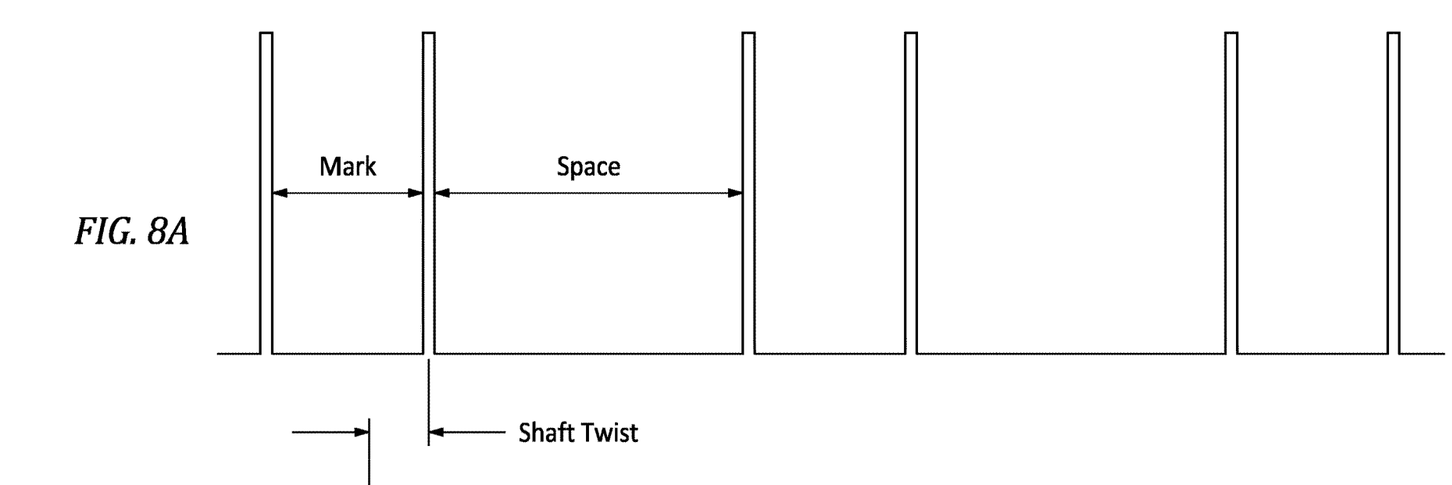
FIGS. 8A and 8B collectively graphically illustrate movement between the sensor rotor teeth during different modes of turbine engine operation.
Figure 8B:
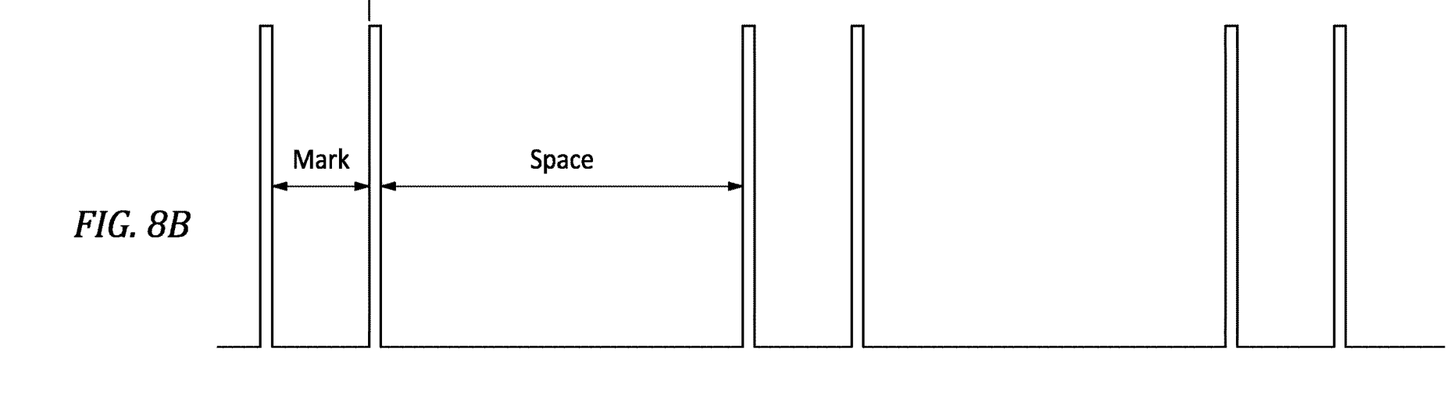

FIGS. 8A and 8B illustrates how the time counters may change relative to torque applied to the engine shaft 74. Each of the time counters includes a mark counter (labeled as "mark") and a space counter (labeled as "space"). The term "mark counter" may describe a temporal duration between tips of the rotor teeth 76 and 84 in a common set (e.g., the same set) passing the sensor probe 68. The term "space counter" may describe a temporal duration between a tip of a last one of the rotor teeth (e.g., 84) in a set and a tip of a first one of the rotor teeth (e.g., 76) in an adjacent (e.g., rotationally next) set passing the sensor probe 68. Referring to FIG. 8A, when a relatively low torque (or no torque) is applied to the engine shaft 74, the mark counter may be relatively large and the space counter may be relatively small. Thus, a circumferential distance between tips of the rotor teeth 76 and 84 in a common set is relatively large (or small). Referring to FIG. 8B, when a relatively high torque is applied to the engine shaft 74, the mark counter may be relatively small and the space counter may be relatively large. Thus, the circumferential distance between tips of the rotor teeth 76 and 84 in a common set is relatively small (or large). The controller 60 may correlate this change in the mark counter, the change in the space counter and/or the change in the circumferential distance between tips to determine the twist of the engine shaft 74 (shaft twist) and/or the torque applied to the engine shaft 74 (shaft torque).

Figure 9:
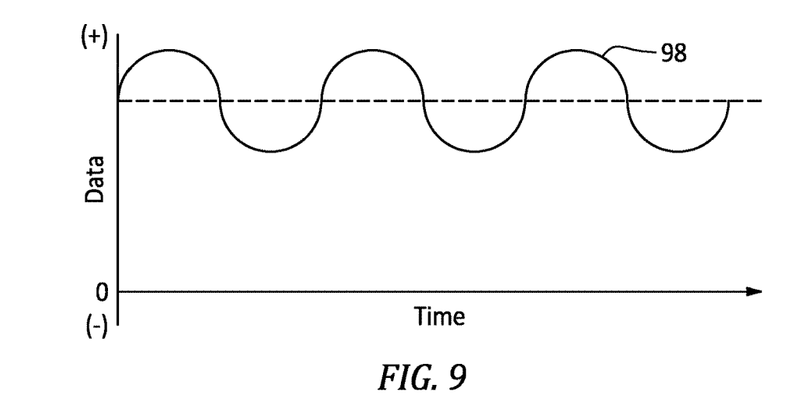
FIG. 9 graphically illustrates shaft twist and/or shaft torque relative to time during normal turbine engine operation.

Referring to FIG. 9, during normal turbine engine operation, the shaft twist and/or the shaft torque (see signal 98) may slightly fluctuate up and down due to, for example, tolerance, vibrations, environmental condition, etc. During this normal turbine engine operation, however, the shaft twist and/or the shaft torque may remain positive. In other words, a value of the shaft twist and/or a value of the shaft torque may not dip below a zero (0) value since the engine shaft 74 of FIG. 3 transmits a positive torque from an input 100 (e.g., at least one of the turbine rotors 36, 37 of FIG. 1) to a load 102 (e.g., one of the rotors 34, 35 of FIG. 1).

Figure 10:
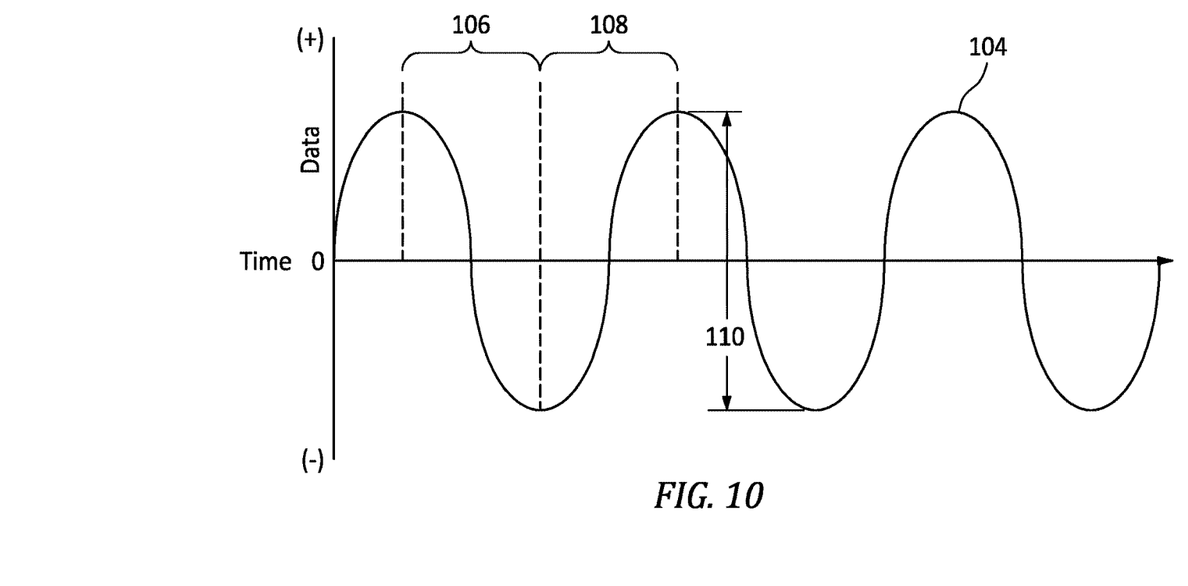
FIG. 10 graphically illustrates the shaft twist and/or the shaft torque relative to time following a shaft shear event.

Referring to FIG. 10, in a case of a shaft shear event (e.g., fracture of the engine shaft 74 between the input 100 and the load 102), the torque transmitted by the engine shaft 74 may suddenly drop to a zero (0) value and the engine shaft 74 may free spin since there is no longer a (e.g., significant, besides rotational bearing drag, windage, etc.) load to counteract the torque applied by the input 100. However, due to the rapid drop in transmitted torque, the engine shaft 74 may be subject to ringing. More particularly, as the shaft twist drops to the zero value, momentum of the untwisting may cause the engine shaft 74 to twist partially in a negative value direction. Similarly, as the shaft torque drops to the zero value, the momentum of the untwisting may cause the engine shaft 74 to be subject to a negative value torque. This ringing effect is shown in FIG. 10 where the value of the shaft twist and/or the value of the shaft torque (see signal 104) fluctuates (e.g., rings, oscillates, etc.) above and below a zero value baseline. When the shaft twist value/the shaft torque value is above the zero value baseline, that value has a positive (+) value sign; e.g., the value is a mathematical positive number. When the shaft twist value and/or the shaft torque value is below the zero value baseline, that value has a negative (−) value sign; e.g., the value is a mathematical negative number.

In step 608, the controller 60 monitors the shaft twist data and/or the shaft torque data to identify one or more reversal events. The term "reversal event" may describe a reversal in the value sign of the data from one point in time to another point in time. For example, referring to FIG. 10, a first reversal event occurs in a first period of time 106. In this first period of time 106, the value sign of the monitored shaft twist data and/or the monitored shaft torque data changes from a positive value sign to a negative value sign. By contrast a second (e.g., opposite) reversal event occurs in a second period of time 108. In this second period of time 108, the value sign of the monitored shaft twist data and/or the monitored shaft torque data changes from a negative value sign to a positive value sign.

In step 610, the controller 60 identifies shaft shear in the engine shaft 74 based on occurrence of N-number of the reversal events. In other words, where the controller 60 identifies N-number of the reversal events have occurred (e.g., ringing of the monitored data about the zero value baseline) in a predetermined period (e.g., period of time), the controller 60 will determine the engine shaft 74 has sheared. The N-number of reversal events may be a single event (e.g., N=1), or the N-number of events may be multiple events (e.g., N≥2). The N-number of reversal events may be selected in order to reduce (e.g., minimize) duration/time before identifying shaft shear, while at the same time reducing (e.g., minimizing) likelihood of or preventing false positives.

The value of N may be constant. Alternatively, the value of N may change based on one or more operational parameters of the turbine engine 22. Examples of these operational parameters may include, but are not limited to, rotational speed of the engine shaft 74 and power output (e.g., thrust output, torque output, etc.) of the turbine engine 22. For example, where the rotational speed of the engine shaft 74 is relatively slow and/or the power output of the turbine engine 22 is relatively low, there may be more time to gather data before identifying shaft shear. In such conditions therefore the value of N may be relatively high. However, where the rotational speed of the engine shaft 74 is relatively fast and/or the power output of the turbine engine 22 is relatively high, there may be less time to gather data before identifying shaft shear. In such conditions therefore the value of N may be relatively low.

The predetermined period for identifying the reversal events may be constant. Alternatively, the predetermined period for identifying the reversal events may be varied based on, for example, the one or more operational parameters of the turbine engine 22. For example, where the rotational speed of the engine shaft 74 is relatively slow and/or the power output of the turbine engine 22 is relatively low, the predetermined period for identifying the reversal events may be relatively long/large. However, where the rotational speed of the engine shaft 74 is relatively fast and/or the power output of the turbine engine 22 is relatively high, the predetermined period for identifying the reversal events may be relatively short/small.

In some embodiments, the reversal event may be of any magnitude. In other embodiments, the reversal event may only be counted where a magnitude 110 (see FIG. 10) between a maximum positive value and a maximum negative value is greater than a predetermined threshold.

In step 612, the controller 60 shuts down the turbine engine 22 when the shaft shear in the engine shaft 74 is identified. The controller 60 of FIG. 2, for example, may signal the flow regulator 64 (e.g., the pump and/or the valve) to stop a flow of fuel from the fuel reservoir 62 to the fuel injectors 52. In this manner, the controller 60 may prevent an overspeed event of the engine shaft 74 and the input 100 (e.g., one of the turbine rotors 36, 37).

In some embodiments, the predetermined period for identifying the reversal events is controlled by providing a continuously updated buffer memory. For example, the controller 60 may monitor the shaft twist data and/or the shaft torque data stored in the buffer memory. As new values for the shaft twist data and/or the shaft torque data are determined and entered, the oldest values are deleted. Thus, the predetermined period may be related to a number of data values entered opposed to a specific temporal duration.

The method 600 is described above with respect to the turbofan turbine engine 22 of FIG. 1. However, the method 600 may also be utilized for other types of gas turbine engines as described above. For example, the method 600 may be utilized for a turboprop turbine engine where, for example, the input 100 is a turbine rotor and the load 102 is a compressor rotor or a propeller rotor. In another example, the method 600 may be utilized for a turboshaft turbine engine where, for example, the input 100 is a turbine rotor and the load 102 is a compressor rotor or a helicopter rotor. In still another example, the method 600 may be utilized for an auxiliary power unit or an industrial turbine engine where, for example, the input 100 is a turbine rotor and the load 102 is a compressor rotor or a generator. The present disclosure, of course, is not limited to the foregoing exemplary arrangements.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method involving a turbine engine, comprising:
receiving data indicative of twist of a shaft of the turbine engine;
monitoring the data over time to identify one or more reversal events while the turbine engine is operating, wherein each of the reversal events corresponds to a reversal in a value sign of the data; and
identifying shaft shear in the shaft based on occurrence of N number of the reversal events.

2. The method of claim 1, wherein the N number of the reversal events is one of the reversal events.

3. The method of claim 1, wherein the N number of the reversal events is two or more of the reversal events.

4. The method of claim 1, wherein the N number of the reversal events changes based on an operational parameter of the turbine engine.

5. The method of claim 4, wherein the operational parameter comprises rotational speed of the shaft.

6. The method of claim 4, wherein the operational parameter comprises power output of the turbine engine.

7. The method of claim 1, wherein the identifying of the shaft shear in the shaft is further based on the N number of the reversal events occurring within a predetermined period.

8. The method of claim 7, wherein the predetermined period changes based on an operational parameter of the turbine engine.

9. The method of claim 8, wherein the operational parameter comprises rotational speed of the shaft.

10. The method of claim 8, wherein the operational parameter comprises power output of the turbine engine.

11. The method of claim 1, wherein the identifying of the shaft shear in the shaft is further based on a magnitude of at least one of the N number of the reversal events.

12. The method of claim 1, further comprising shutting down the turbine engine when the shaft shear in the shaft is identified.

13. The method of claim 1, wherein the occurrence of the N number of the reversal events is indicative of ringing of the data.

14. The method of claim 1, wherein the data is further indicative of torque applied to the shaft.

15. The method of claim 1, wherein a first of the reversal events corresponds to an operational parameter of the turbine engine having a positive value at a first point in time and a negative value at a second point in time.

16. A method involving a turbine engine, comprising:
providing data indicative of torque applied to a shaft of the turbine engine;
monitoring the data over a period to identify ringing in the monitored data while the turbine engine is operating, wherein the ringing in the monitored data indicates the torque applied to the shaft has a positive value at a first point in time and a negative value at a second point in time; and
identifying shaft shear in the shaft based on occurrence of the ringing in the monitored data.

17. The method of claim 16, wherein
the ringing includes a plurality of reversal events in the monitored data; and
each of the reversal events corresponds to a reversal in a value sign of the monitored data.

18. An assembly for a turbine engine, comprising:
a shaft;
a sensor configured to provide sensor data indicative of a parameter of the shaft, the parameter comprising at least one of twist of the shaft or torque applied to the shaft; and
a controller configured to monitor the sensor data over time to identify one or more reversal events while the turbine engine is operating, each of the reversal events corresponding to a reversal in a value sign of the sensor data, and the controller further configured to identify shaft shear in the shaft based on occurrence of N number of the reversal events.

19. The assembly of claim 18, further comprising:
a fuel system comprising a flow regulator;
the controller further configured to signal the flow regulator to stop fuel flow when the shaft shear in the shaft is identified.

20. The assembly of claim 18, further comprising:
a load; and
a turbine rotor;
the shaft coupling the load to the turbine rotor.

* * * * *